(12) United States Patent
Sugitani (10) Patent No.: US 10,044,809 B2
(45) Date of Patent: Aug. 7, 2018

(54) WIRELESS COMMUNICATION DEVICE FOR TRANSMITTING AND RECEIVING PACKETIZED DATA

(71) Applicant: PANASONIC INTELLECTUAL PROPERTY MANAGEMENT CO., LTD., Osaka (JP)

(72) Inventor: Toshiyuki Sugitani, Saga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 104 days.

(21) Appl. No.: 14/930,732

(22) Filed: Nov. 3, 2015

(65) Prior Publication Data

US 2016/0150022 A1   May 26, 2016

(30) Foreign Application Priority Data

Nov. 20, 2014   (JP) .................. 2014-235375

(51) Int. Cl.
  *G08C 17/00*   (2006.01)
  *H04L 29/08*   (2006.01)
  (Continued)

(52) U.S. Cl.
  CPC ............ *H04L 67/14* (2013.01); *H04L 1/1809* (2013.01); *H04L 1/1829* (2013.01);
  (Continued)

(58) Field of Classification Search
  CPC ....... H04L 67/14; H04L 1/08; H04L 12/2803; H04L 67/12; H04L 2012/2841; H04W 52/0216; Y02B 60/50
  See application file for complete search history.

(56) References Cited

U.S. PATENT DOCUMENTS

| 6,389,016 | B1 | 5/2002 | Sabaa et al. |
| 2005/0210242 | A1* | 9/2005 | Troxel ...................... H04L 9/12 713/160 |

(Continued)

FOREIGN PATENT DOCUMENTS

| EP | 0 886 410 | 12/1998 |
| JP | 10-308791 | 11/1998 |

(Continued)

OTHER PUBLICATIONS

"Digital Enhanced Telecommunications (DECT); Ultra Low Energy (ULE); Machine to Machine Communications; Part 1: Home Automation Network (phase 1)", ETSI TS 102 939-1, V1.1.1, Apr. 2013, pp. 1-169.

(Continued)

*Primary Examiner* — Abdelnabi O Musa
(74) *Attorney, Agent, or Firm* — Greenblum & Bernstein, P.L.C.

(57) ABSTRACT

Provided is a wireless communication device for packet communication. When power is applied, in a case where a packet data is received before receiving a message notifying that packet communication starts, the other party is urged to transmit a message saying that the packet communication starts and a packet number is initialized in accordance with transmission and reception of the message that the packet communication starts.

3 Claims, 6 Drawing Sheets

(51) Int. Cl.
*H04W 52/02* (2009.01)
*H04L 12/28* (2006.01)
*H04L 12/939* (2013.01)
*H04L 1/18* (2006.01)

(52) U.S. Cl.
CPC ........ *H04L 12/2803* (2013.01); *H04L 49/552* (2013.01); *H04L 67/12* (2013.01); *H04W 52/0216* (2013.01); *H04L 2012/2841* (2013.01); *Y02D 70/00* (2018.01); *Y02D 70/142* (2018.01)

(56) References Cited

U.S. PATENT DOCUMENTS

| | | | |
|---|---|---|---|
| 2009/0161572 A1* | 6/2009 | Lagrange | H04L 1/203 370/252 |
| 2009/0268747 A1 | 10/2009 | Kurata et al. | |
| 2013/0121223 A1 | 5/2013 | Sugitani | |
| 2013/0194958 A1* | 8/2013 | Gustafsson | H04L 65/604 370/252 |
| 2015/0161882 A1* | 6/2015 | Lett | G08B 25/001 340/506 |
| 2015/0359075 A1* | 12/2015 | Keirstead | H05B 37/0272 315/362 |

FOREIGN PATENT DOCUMENTS

| | | |
|---|---|---|
| JP | 2000-151700 | 5/2000 |
| JP | 2003-218876 | 7/2003 |

OTHER PUBLICATIONS

"Digital Enhanced Cordless Telecommunications (DECT); Common Interface (CI); Part 2: Physical Layer (PHL)", ETSI EN 300 175-2, V1.9.1, Sep. 2005, pp. 1-64.

"Digital Enhanced Telecommunications (DECT); Common Interface (CI); Part 3: Medium Access Control (MAC) layer", ETSI EN 300 175-3, V1.9.1, Sep. 2005, pp. 1-235.

"Digital Enhanced Cordless Telecommunications (DECT); Common Interface (CI); Part 5: Network (NWK) layer", ETSI EN 300 175-5, V1.9.1, Sep. 2005, pp. 1-309.

The Extended European Search Report dated Apr. 15, 2016 for the related European Patent Application No. 15192904.9.

* cited by examiner

WIRELESS COMMUNICATION DEVICE FOR TRANSMITTING AND RECEIVING PACKETIZED DATA

BACKGROUND OF THE INVENTION

1. Field of the Invention

The present invention relates to a wireless communication device.

2. Description of the Related Art

In recent years, with the remarkable spread of data communication that is performed in a wireless manner, there have been advances in high communication speed, miniaturization of a wireless communication device, and low power consumption. For example, wireless communication in compliance with a Digital Enhanced Cordless Telecommunications (DECT) scheme that has been spread worldwide as a communication scheme for digital cordless telephones is stipulated in ETSI EN 300 175-2: "Digital Enhanced Cordless Telecommunications (DECT); Common Interface (CI); Part2: Physical Layer (PHL)," ETSI EN 300 175-3: "Digital Enhanced Cordless Telecommunications (DECT); Common Interface (CI); Part3: Medium Access Control (MAC) layer," and ETSI EN 300 175-5: "Digital Enhanced Cordless Telecommunications (DECT); Common Interface (CI); Part5: Network (NWK) layer." Also in Japan, the use of wireless devices in compliance with the DECT scheme was approved, and wireless communication devices such as a cordless telephone and an intercommunication system have been of practical use. In recent years, a system in which household electrical appliances within a house are controlled from outside of the house, a household crime prevention system, or the like has gained popularity. Developments in wireless communication for communication between apparatuses on such a home automation network have been made. A method for packet communication suitable for communication between apparatuses on the home automation network, which is based on the wireless communication in compliance with the DECT scheme, is stipulated in ETSI TS 102 939-1: "Digital Enhanced Cordless Telecommunications (DECT); Ultra Low Energy (ULE); Machine-to-Machine Communications; Part 1; Home Automation Network (Phase 1)" (communication that is stipulated in this is hereinafter described as DECT ULE communication). In such packet communication, data is stored in a packet to which a number is added, transmission of and reception of data are performed on a packet-by-packet basis, re-transmission control is performed using the number that is added to the packet, and the transmission of and the reception of data are performed. In a case of the DECT ULE communication, when the data to be transmitted or received is not present, the wireless communication is interrupted, and when the transmission of the data starts, the packet communication is resumed with a simple sequence. Furthermore, regardless of the interruption of the wireless communication, the packet communication is performed using consecutive packet numbers. Thus, low power consumption and reduction in data transmission delay are realized.

SUMMARY OF THE INVENTION

According to an aspect of the present invention, there is provided a wireless communication device that performs data communication using a packet to which a packet number is added from one wireless communication device to the other wireless communication device, in which a first wireless communication device includes a wireless communication unit for transmitting and receiving packetized data, a packet number storage unit in which the packet number that is added to the received packet is stored, and a control unit that operates in such a manner that transmission of a message saying that packet communication starts is requested, in a case where the packetized data is received before the message saying that the packet communication starts is received, after an operation starts, in which a second wireless communication device includes a wireless communication unit for transmitting and receiving packetized data, a packet number storage unit in which a packet number that is given to a packet to be transmitted is stored, and a control unit that operates in such a manner that the message saying that the packet communication starts is transmitted, in a case where the transmission of the message saying the packet communication starts is requested by the first wireless communication device, and in which the second wireless communication device starts wireless communication with the first wireless communication device when data to be transmitted occurs, operates in such a manner as to disconnect the wireless communication when the packetized data is no longer sent, operates in such a manner that the packet number that is given to the packet is updated for every packet, and operates in such a manner that a packet number that is transmitted and received for the first time after the message saying that the packet communication starts is a value that is determined in advance.

Accordingly, in a case where power is re-applied to only the first wireless communication device, when the packet is received from the second wireless communication device after the power is applied to the first wireless communication device, the packet number can be initialized and the packet communication can be resumed. For this reason, the first wireless communication device, when powered off, neither needs to retain the packet number, nor needs to use a nonvolatile memory as a means of storing the packet number, such as an EEPROM.

In the wireless communication device according to the aspect of the present invention, a disconnection message may be transmitted that includes a request for the transmission of the message saying that the packet communication starts, in a case where the packetized data is received before the message saying the packet communication starts is received, after the operation starts.

Accordingly, in a case where the packet is transmitted without the second wireless communication device knowing that the first wireless communication device is temporarily powered off, the second wireless communication device receives the disconnection message that includes the request for the transmission of the message saying that the packet communication starts, and thus, can know that the message saying that the packet communication starts needs to be transmitted in order to resume the packet communication. As a result, the packet communication is smoothly resumed after the first wireless communication device is temporarily in a state of being powered off.

In the wireless communication device according to the aspect of the present invention, the message notifying that the wireless communication is disconnected may be transmitted without transmitting a delivery acknowledgement message notifying that the packet is received, and may disconnect the wireless communication, in a case where the packetized data is received before the message saying that the packet communication starts is received, after the operation starts.

Accordingly, the second wireless communication device can know that the message saying that the packet communication starts needs to be transmitted in order to resume the packet communication, by the packet communication being disconnected before the delivery acknowledgement is performed, and the packet communication is resumed smoothly with simpler control after the first wireless communication device is temporarily in the state of being powered off, in a case where the packet is transmitted without the second wireless communication device knowing that the first wireless communication device is temporarily in the state of being powered off.

In the wireless communication device according to the aspect of the present invention, the second wireless communication device may further include a power control unit that operates in such a manner that power is always supplied to the packet number storage unit and that power is supplied to the wireless communication unit and the control unit when the communication with the first wireless communication device is performed.

Accordingly, the second wireless communication device reduces power consumption in a waiting state in which the data transmission is not necessary.

DETAILED DESCRIPTION OF THE PREFERRED EMBODIMENT

In packet communication where packet communication is performed using consecutive packet numbers regardless of interruption of wireless communication, like in DECT ULE communication, there is a need to store the packet number even while the wireless communication remains interrupted. A wireless communication apparatus that operates on commercial electric power needs to store the packet number in a nonvolatile memory, such as an EEPROM, just in case power interruption, such as a power failure, takes place. However, the number of times that writing is performed on the nonvolatile memory, such as the EEPROM, is limited. In a case where the nonvolatile memory is used for storing data that, like the packet number, is frequently changed, there is a need to perform control to be performed in such a manner that the number of times that writing is performed does not exceed a limitation and a writing area is changed and a need to secure storage areas of which the number is greater than the number of pieces of data that are actually stored. Furthermore, in a control station (for example, a control station of a crime prevention system that accommodates multiple window sensors) that performs communication with multiple slave stations, there is a need to store the packet number in every slave station and a need to secure more storage areas, and there are problems of driving costs up and causing control complexity.

An embodiment of the present invention will be described below.

First Exemplary Embodiment

Configuration of a Cordless Telephone

Figure 1:
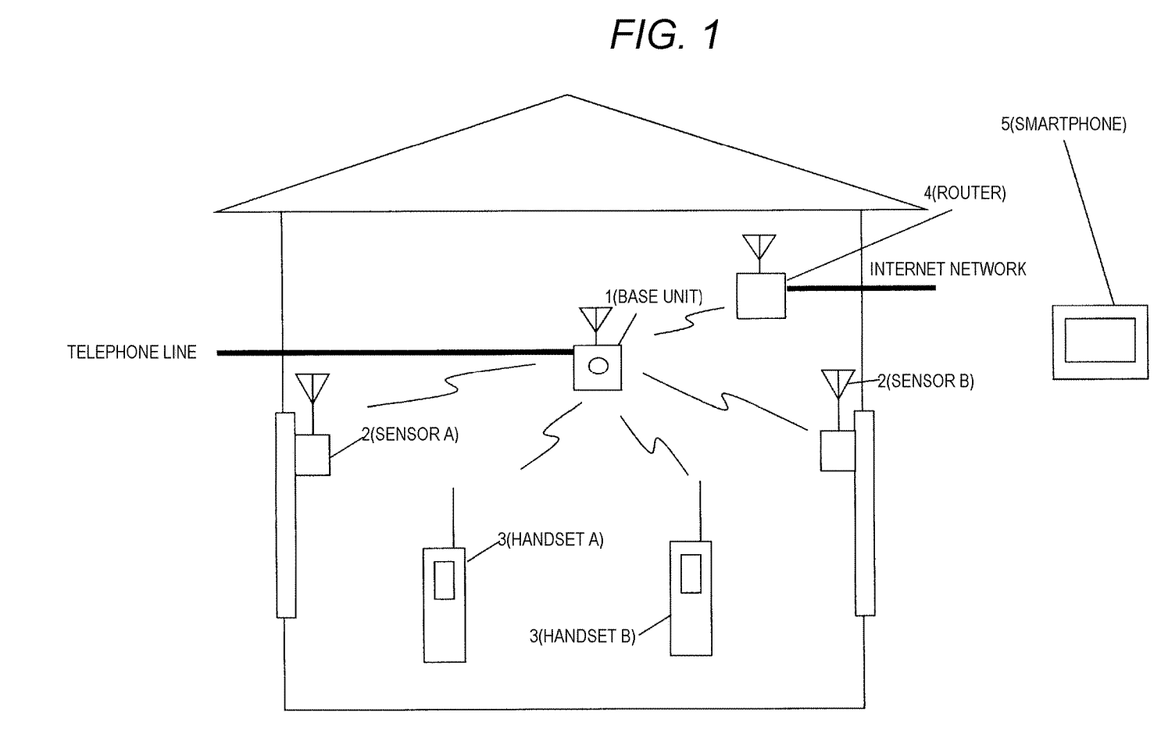
FIG. 1 is a diagram illustrating one example of a home automation network system that uses a wireless communication device according to a first exemplary embodiment.

A configuration example of a wireless communication device according to a first exemplary embodiment is described. FIG. 1 is a diagram illustrating one example of a home automation network system that uses the wireless communication device according to the present embodiment.

The home automation network system that uses the wireless communication device according to the present invention, which is described in FIG. 1, is a system that realizes a telephone function for an outside-line call or for an inside-line call and a crime prevention function of notifying a user inside of or outside of a house that a window is opened or closed. FIG. 1 illustrates a case where the home automation network system is configured from base unit 1, sensor A2, sensor B2, handset A3, handset B3, router 4, and smartphone 5. Sensor A2 and sensor B2 that have the same function, and handset A3 and handset B3 that have the same function are described below as sensor 2 and handset 3, respectively.

In the home automation network system that uses the wireless communication device according to the present invention, which is described in FIG. 1, communication through wireless communication, for example, in compliance with a DECT scheme is possible between base unit 1 and sensor 2 and between base unit 1 and handset 3, and communication through wireless communication, for example, in compliance with a WiFi scheme is possible between base unit 1 and router 4. Base unit 1 is connected to smartphone 5 through router 4 over the Internet.

A user performs an outside-line telephone calling or an inside-line telephone calling with handset 3, by using the home automation network system that uses the wireless communication device according to the present invention, which is illustrated in FIG. 1.

The home automation network system that uses the wireless communication device according to the present invention, which is illustrated in FIG. 1, operates in a normal mode or in a crime prevention mode. The crime prevention mode is a mode in which the user is notified through an alarm and the like that the window is opened, and the normal mode is a mode in which the user is not notified that the window is opened. The user activates the crime prevention mode when he/she leaves the house or goes to bed, and is protected against a burglar's break-in.

In a case where the home automation network system operates in the crime prevention mode, when sensor 2 notifies base unit 1 that a window is opened, base unit 1 notifies handset 3 that the window is opened, base unit 1 and handset 3 raise the alarm, and thus a person in each room is notified that the window is opened. Base unit 1 makes a call to a designated telephone number through a telephone line, and, when the other party answers the call, transmits an audio message notifying that the window is opened. Base unit 1 transmits an electronic mail that notifies a registered address that the window is opened, through router 4 over the Internet, and notifies the user of a smartphone that the window is opened.

Configuration of Base Unit 1

Figure 2:
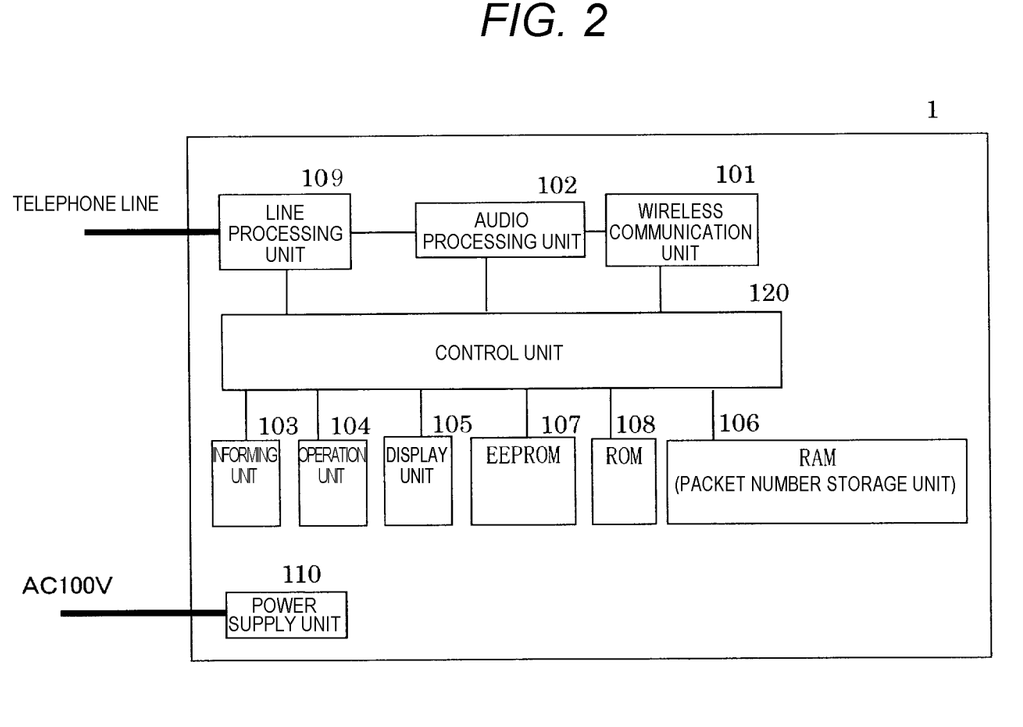
FIG. 2 is a block diagram illustrating one example of a configuration of a base unit according to the first exemplary embodiment.

A configuration example of base unit 1 is described. FIG. 2 is a block diagram illustrating a configuration example of base unit 1.

In FIG. 2, base unit 1 has wireless communication unit 101, audio processing unit 102, informing unit 103, operation unit 104, display unit 105, RAM (packet number storage unit) 106, EEPROM 107, ROM 108, power supply unit 110, and control unit 120.

Wireless communication unit 101 transmits and receives control data or a packet for wireless link establishment or a data telephone call to and from sensor 2, handset 3, and router 4 in a predetermined scheme that depends on a device of each of sensor 2, handset 3, and router 4. In the present specification, "wireless communication" is defined as including wireless transmission and wireless reception.

Audio processing unit 102 converts an audio signal that is input from the telephone line, into a digital signal, generates audio data for transmission to handset 3, converts audio data that is received from handset 3, or data for audio guidance that notifies that a window is opened, into an analog signal, and outputs the resulting analog signal to the telephone line.

In the case where the home automation network system operates in the crime prevention mode, when sensor 2 notifies base unit 1 that the window is opened, informing unit 103 outputs an informing sound.

Operation unit 104 is a button to which a user operation is applied. The user operations, for example, include an operation of stopping the informing sound, an operation of switching between the crime prevention mode and the normal mode, and the like.

Information is displayed, for the user, on display unit 105. The information, for example, is information indicating whether a current operation state is the crime prevention mode or the normal mode.

Among pieces of information necessary for executing a program for controlling base unit 1, RAM (packet number storage unit) 106 is used for storing data that does not need to be retained at the time of power-off. In a case where the entire RAM (packet number storage unit) 106, also including a storage unit for managing the packet number that is transmitted from the sensor, is referred to, this is described below as RAM 106. In a case where only a storage unit for managing the packet number of RAM (packet number storage unit) 106 is referred to, this is described below as packet number storage unit 106.

Among the pieces of information necessary for executing the program for controlling base unit 1, EEPROM 107 is used for storing data that needs to be retained even at the time of power-off. For example, an identification number for identifying base unit 1 itself or the other party, a telephone number of or a mail address of the other party in a case where the user outside of a house is notified that the window is opened, and the like, which are necessary for performing wireless communication with sensor 2 and handset 3, are stored.

ROM 108 is a memory into which the program for controlling base unit 1 is embedded.

Power supply unit 110 produces a direct current that is necessary for each unit of base unit 1 to operate, from 100 V commercial electric power, and supplies the direct current to each block of base unit 1 (connection to each unit is not illustrated).

Control unit 120 is configured as a central processing unit (CPU), and controls operation of entire base unit 1 in cooperation with each unit described above. Operation of control unit 120 will be described in detail below.

Functional units that are included in base unit 1 are not limited to 101 to 120 that are illustrated in FIG. 2, and may include other functional units. The other functional units may be ones that realize main functions of base unit 1, and may be ones that realize auxiliary functions that assist the main functions.

Configuration of Sensor 2

Figure 3:
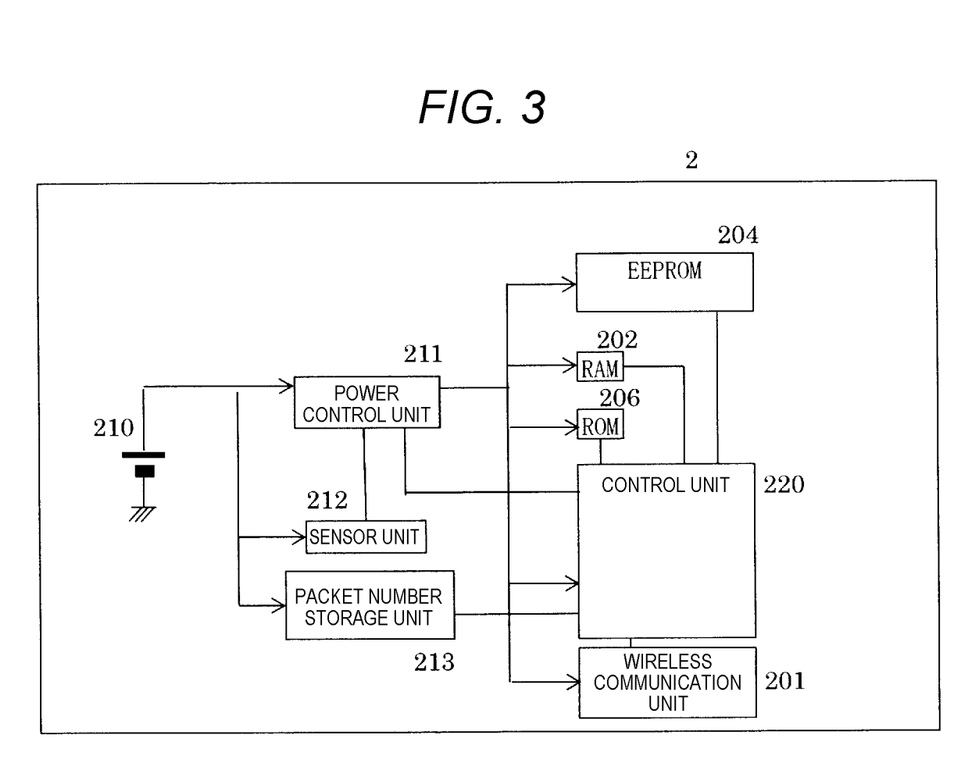
FIG. 3 is a block diagram illustrating one example of a configuration of a sensor according to the first exemplary embodiment.

A configuration example of sensor 2 is described. FIG. 3 is a block diagram illustrating a configuration example of sensor 2.

In FIG. 3, sensor 2 has wireless communication unit 201, RAM 202, EEPROM 204, ROM 206, battery 210, power control unit 211, sensor unit 212, packet number storage unit 213, and control unit 220.

Wireless communication unit 201 transmits and receives the control data or the packet for the wireless link establishment or the data telephone call to and from base unit 1 in a predetermined scheme.

Among pieces of information necessary for executing a program for controlling sensor 2, RAM 202 is used for storing data that does not need to be retained when the power control unit interrupts power supply.

Among the pieces of information necessary for executing the program for controlling sensor 2, EEPROM 204 is used for storing data that needs to be retained even at the time of power-off. For example, the identification number for identifying sensor 2 itself or the other party, which is necessary for performing the wireless communication with base unit 1, and the like are stored.

ROM 206 is a memory into which a program for controlling sensor 2 is embedded.

Battery 210 is a battery that supplies power necessary for operation of sensor 2. For example, a lithium battery with a rated output of 3V and the like are used. Power is supplied from battery 210 directly to sensor unit 212 and packet number storage unit 213, and is supplied from battery 210 through power control unit 211 to wireless communication unit 201, RAM 202, EEPROM 204, ROM 206, and control unit 220.

Power control unit 211 supplies the power that is supplied from battery 210, to wireless communication unit 201, RAM 202, EEPROM 204, ROM 206, and control unit 220 according to a signal from sensor unit 212, and cuts off power supply to wireless communication unit 201, RAM 202, EEPROM 204, ROM 206, and control unit 220 according to a signal from control unit 220.

Sensor unit 212 detects that the window is opened, and outputs a signal (described as a power-on signal) that is to be supplied to wireless communication unit 201, RAM 202, EEPROM 204, ROM 206, and control unit 220, to power control unit 211.

Control unit 220 is configured as a central processing unit (CPU) and controls operation of entire sensor 2 in cooperation with each unit described above. When sensor unit 212 detects that the window is opened, control unit 220 activates wireless communication, notifies base unit 1 that the window is opened, and outputs to power control unit 211 a signal (described as a power-off signal) for interrupting the wireless communication and cutting off the power supply to wireless communication unit 201, RAM 202, EEPROM 204, ROM 206, and control unit 220. The operation of control unit 220 will be described in detail below.

Functional units that are included in sensor 2 are not limited to 201 to 220 that are illustrated in FIG. 3, and may include other functional units. The other functional units may be ones that realize main functions of sensor 2, and may be ones that realize auxiliary functions that assist the main functions.

Operation of Each of Base Unit 1 and Sensor 2

An operational example of the home automation network system that uses the wireless communication device according to the present invention, which is described above, is described.

Figure 4:
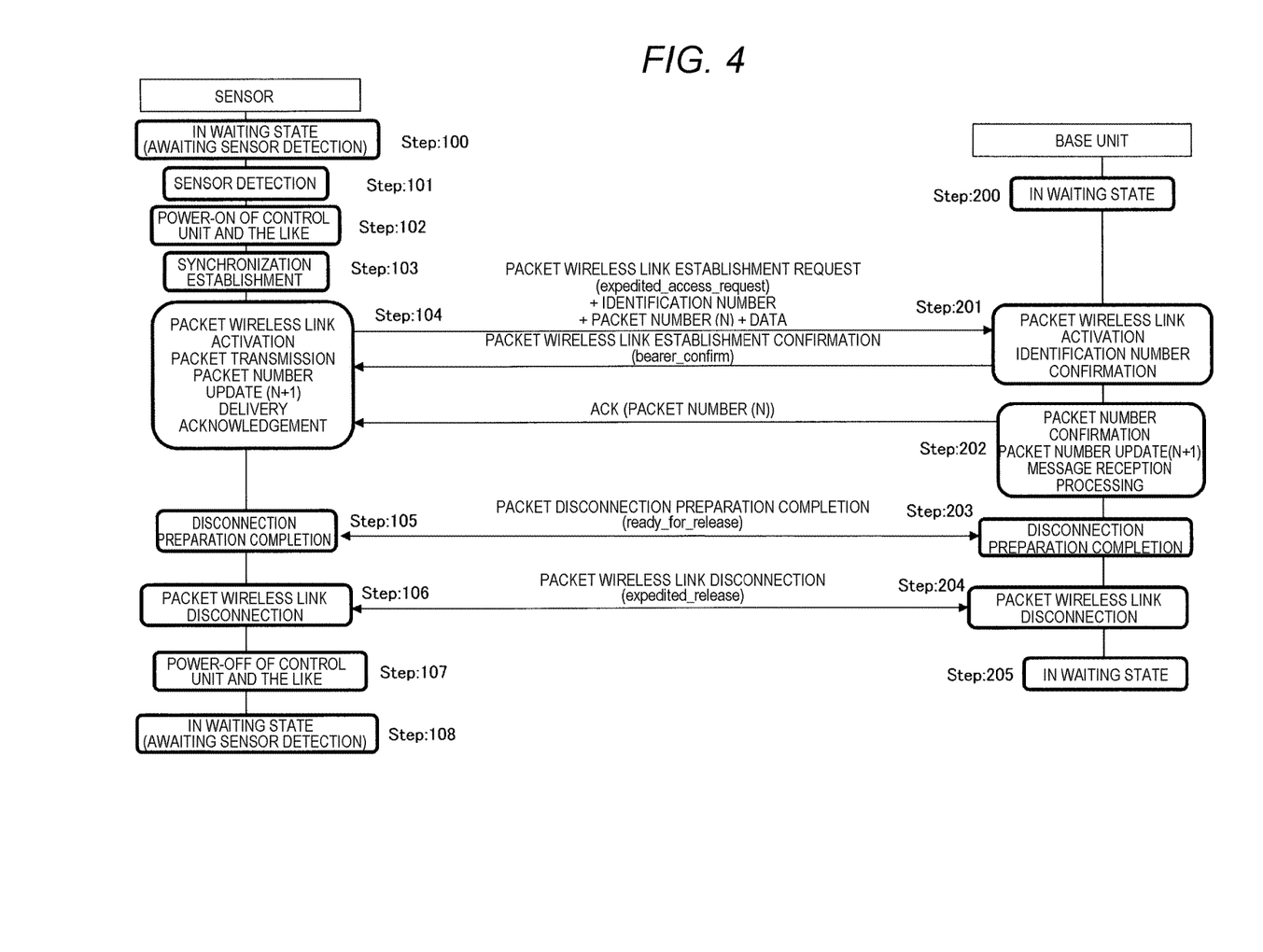
FIG. 4 is a diagram illustrating one example of a signal that is transmitted and received through wireless communication between the base unit and the sensor according to the first exemplary embodiment and of operation of each of the base unit and the sensor.

FIG. 4 is a diagram illustrating one example of a signal that is transmitted and received through wireless communication between base unit 1 and sensor 2 when it is detected that the window is opened, and of operation of each of base unit 1 and sensor 2.

In a waiting state, in sensor 2, power is supplied only to sensor unit 212 and packet number storage unit 213, and sensor unit 212 operates in such a manner as to detect that the window is opened (Step: 100).

On the other hand, in the waiting state, in base unit 1, control unit 120 operates in such a manner that wireless communication unit 101 is controlled to receive a signal from the sensor while transmitting a signal (hereinafter referred to as a control signal) for enabling the sensor to recognize the base unit and to retain synchronization (Step: 200).

When it is detected in sensor unit 212 of sensor 2 that the window is opened, sensor unit 212 outputs the power-on signal to power control unit 211 (Step: 101), power is supplied to control unit 220 and the like through power control unit 211 (Step: 102), and control to perform the wireless communication with the base unit is started.

Control unit 220 that is supplied with power and thus starts to operate establishes synchronization to the base unit, and controls wireless communication unit 201 in such a manner as to activate the wireless communication (Step: 103). For example, in a case where base unit 1 and sensor 2 perform communication through wireless communication in compliance with the DECT scheme, base unit 1 transmits a control signal for enabling a frame and a slot in TDMA to retain synchronization, and by receiving the control signal, sensor 2 establishes the synchronization of the frame and the slot in TDMA to base unit 1 and performs wireless communication in compliance with a TDMA scheme. At this time, base unit 1 transmits the identification number that is stored in EEPROM 107, in a state of being included in the control signal, and by receiving a notification, sensor 2 specifies base unit 1 of the home automation network system to which sensor 2 itself belongs.

When the synchronization to base unit 1 is completed, control unit 220 of sensor 2 transmits to base unit 1 a packet that results from packetizing data of a message notifying base unit 1 of a packet wireless link establishment request and that the window is opened, and performs control in such a manner that delivery acknowledgement is performed (Step: 104). At this time, control unit 220 reads a packet number for the delivery acknowledgement that is attached to a packet, from packet number storage unit 213 and performs control in such a manner that the packet number which is stored in packet number storage unit 213 in preparation for the next-time packet transmission is updated. Control unit 220 reads the identification number which is stored in EEPROM 204 and performs control in such a manner that the identification number which is read as one portion of a wireless establishment request message is transmitted.

On the other hand, when receiving a packet wireless establishment request from sensor 2, control unit 120 of base unit 1 checks an identification number of sensor 2, which is sent, by comparing the identification number of sensor 2 against an identification number of every sensor that is stored in EEPROM 107, and determines from which sensor a signal is sent. In a case where the packet wireless establishment request comes from the handset that is registered, control unit 120 transmits a packet wireless establishment confirmation to sensor 2 and establishes a wireless link for packet communication (Step: 201).

Control unit 120 reads a corresponding packet number of the sensor, among the packet numbers that are stored in packet number storage unit 106, compares whether or not the packet number that is sent, against the packet number that is read, and determines whether or not the two packet numbers are the same. In a case where the packet number that is sent and the packet number of the sensor, which is stored in packet number storage unit 106, are the same, control is performed in such a manner that processing that receives a message that is sent in the packet format, that is, a message notifying that the window is opened, for example, processing that activates the alarm in informing unit 103 or notifies handset 3 and smartphone 5 that the window is opened, is performed, that the packet number corresponding to sensor 2, which is stored in packet number storage unit 106 in preparation for the next-time packet reception, is updated, and that the delivery acknowledgement (ACK) notifying sensor 2 that the packet is received is sent (Step: 202).

When the transmission and reception of the delivery acknowledgement (ACK) is completed and packet communication interruption preparation is completed, both sensor 2 and base unit 1 send a packet disconnection preparation completion message notifying that the packet communication interruption preparation is completed (Step: 105) (Step: 203).

When packet disconnection preparation completion is received and the other party recognizes that packet communication interruption preparation is completed, sensor 2 and base unit 1 transmit a packet wireless link disconnection message notifying that the packet wireless link is disconnected, and interrupt transmission and reception operations for the packet communication (Step: 106) (Step: 204).

When the transmission and reception operations for the packet communication are interrupted, control unit 220 of sensor 2 outputs the power-off signal to power control unit 211 and cuts off the power supply to wireless communication unit 201, RAM 202, EEPROM 204, ROM 206, and control unit 220 (Step: 107), and proceeds to the waiting state in which it is detected that the window is opened (Step: 108).

In the same manner, when the transmission and reception operations for the packet communication are interrupted, base unit 1 also proceeds to the waiting state in which base unit 1 waits for communication with sensor 2 (Step: 205).

In the case where base unit 1 and sensor 2 perform the communication through the wireless communication in compliance with the DECT scheme, the packet wireless link establishment request is a message called expedited access request that is a message for controlling a MAC layer, a packet wireless link establishment confirmation is a message called bearer confirm that is the message for controlling the MAC layer, the packet disconnection preparation completion is a message called ready for release that is the message for controlling the MAC layer, and the packet wireless link disconnection is a message called expedited_release. Packetization of data is performed in compliance with a FU10a format that is stipulated with a DLC layer, and a message (ACK) for the delivery acknowledgement is established in a FU10d format that is stipulated with the DLC layer.

Figure 5:
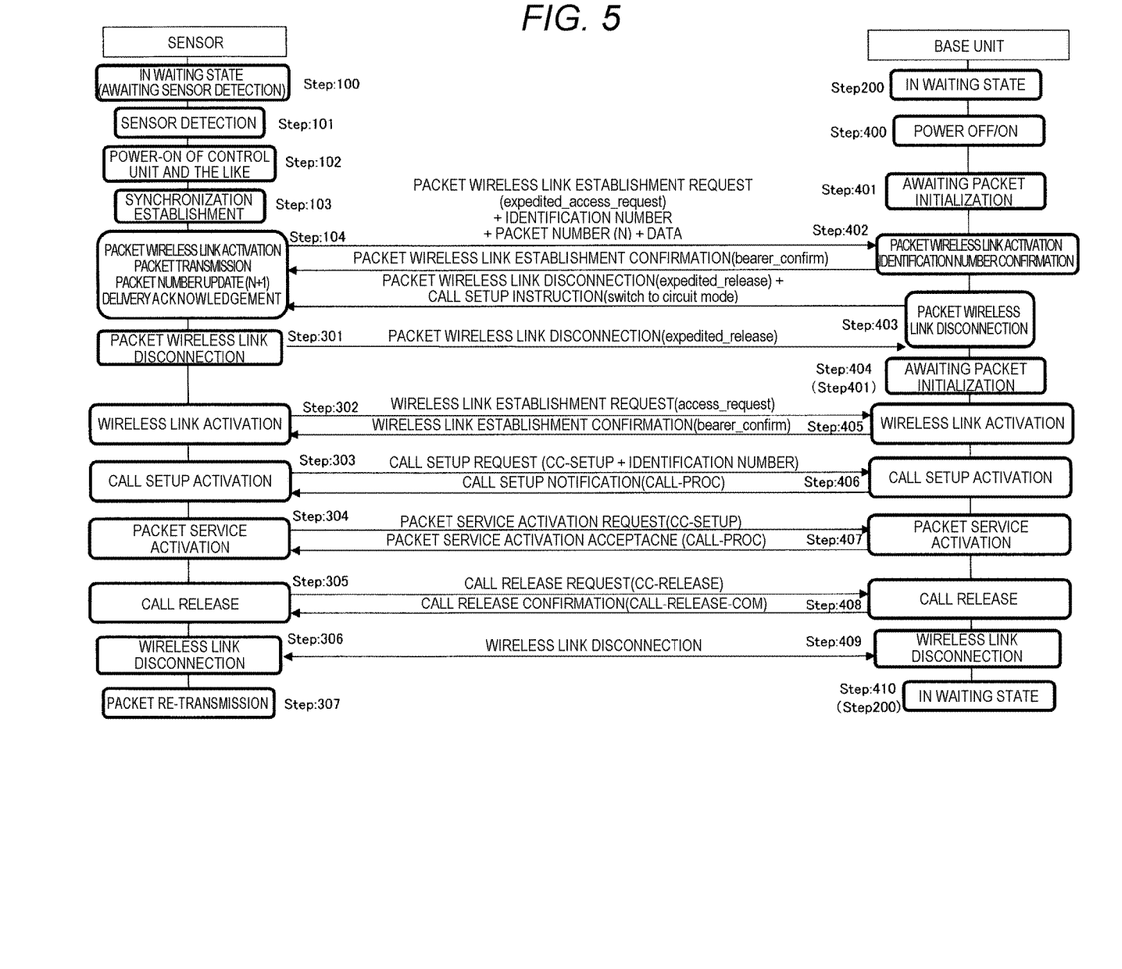
FIG. 5 is a diagram illustrating one example of a signal that, after power is re-applied to the base unit, is transmitted and received through the wireless communication between the base unit and the sensor according to the first exemplary embodiment, and of operation of each of the base unit and the sensor.

Next, an operational example in a case where power is re-applied to base unit 1 that is in operation, in the home automation network system that uses the wireless communication device according to the present invention, which is described above, is described.

FIG. 5 is a diagram illustrating one example of a signal that is transmitted and received through the wireless communication between base unit 1 and the sensor after power is re-applied to the base unit, and of operation of each of base unit 1 and the sensor. In FIG. 5, Step in which the same operation as the operation in FIG. 4 is performed is given the same number, and a description thereof is omitted here.

When in the waiting state (Step: 200), power is re-applied to base unit 1 (Step: 400), control unit 120 proceeds to a packet initialization waiting state (Step: 401) in which, while transmitting a control signal, control unit 120 operates in such a manner that wireless communication unit 101 is controlled to receive a signal from the sensor.

On the other hand, because sensor 2 does not receive a control signal of base unit 1 in the waiting state, even if power is re-applied to base unit 1, sensor 2 cannot recognize this. That is, in sensor 2, when it is detected in the waiting state (Step: 100) that the window is opened (Step: 101), as described above referring to FIG. 4, power is supplied to all units including control unit 120 (Step: 102), synchronization to the base unit is established (Step: 103), and the packet wireless link establishment request and the packet to which the packet number stored in packet number storage unit 213 is added are transmitted to base unit 1 (Step: 104).

When receiving the packet wireless establishment request from sensor 2, control unit 120 of base unit 1 checks the identification number of sensor 2, which is sent, by comparing the identification number of sensor 2 against the identification number of every sensor that is stored in EEPROM 107, and determines from which sensor a signal is sent. In the case where the packet wireless establishment request comes from the handset that is registered, control unit 120 transmits the packet wireless establishment confirmation to sensor 2 and establishes the wireless link for packet communication (Step: 402).

Subsequently, in a case where after being powered on, control unit 120 of base unit 1 receives packet data before packet service activation is completed, control unit 120 of base unit 1 transmits the packet wireless link disconnection notifying that the packet wireless link to which a message for urging the packet service activation is added is disconnected, interrupts the transmission and reception operations for the packet communication (Step: 403), and proceeds to the packet initialization waiting state (Step: 404) in which, while transmitting a control signal, control unit 120 of base unit 1 operates in such a manner that wireless communication unit 101 is controlled to receive a signal from the sensor. A state in Step: 404 is the same as a state in Step: 401 described above and a description thereof is omitted.

Here, an operational example is described in which whether or not the packet service activation is completed is determined. In a case where, for management as to whether or not the packet service activation is completed, an area for managing management as to whether or not the packet service activation is performed is provided in RAM 106 for every sensor, pieces of information for these areas are written, immediately after power is applied, in such a manner that it is indicated that the packet service is non-activated, and processing for the packet service activation is performed between each sensor 2, control is performed in such a manner that the packet service activation being completed is written to an area, which corresponds to sensor 2, for performing the management as to whether or not the packet service activation is completed, and that, when a packet is received from the sensor, checking is performed. There is also a method in which, in a case where the packet number received from the sensor is compared against the packet number of the sensor, which is stored in packet number storage unit 106 and the two packet numbers are the same, it is determined that the packet service is not activated.

Next, operation of sensor 2 that receives the packet wireless link disconnection is described. When receiving the packet wireless link disconnection, sensor 2 transmits the packet wireless link disconnection to base unit 1, and interrupts the transmission and reception operations for the packet communication (Step: 301).

Subsequently, control unit 220 of sensor 2 controls wireless communication unit 201 in such a manner that the wireless link establishment request is transmitted to base unit 1 (Step: 302). When base unit 1 receives the wireless link establishment request, control unit 120 of base unit 1 controls wireless communication unit 101 in such a manner that the wireless link establishment confirmation is transmitted to the sensor (Step: 405), and a wireless link for performing communication of a call control message between base unit 1 and sensor 2 is activated.

When the wireless link for performing the communication of the call control message is activated, sensor 2 reads an identification number that is stored in EEPROM 204 and transmits the identification number that is read as one portion of a call setup request message (Step: 303). Furthermore, base unit 1 checks the identification number for every sensor, which is stored in EEPROM 107, by comparison and determines from which sensor 2 a signal is sent. If the signal is a call setup request from the handset that is registered, base unit 1 transmits a call setup notification and notifies sensor 2 that a call setup is completed and communication of the call control message is possible (Step: 406).

When the communication of the call control message is possible, sensor 2 transmits a packet service activation request for activating the packet communication (Step: 304). When receiving the packet service activation request, base unit 1 transmits packet service activation acceptance (Step: 407).

When packet service activation is completed, control unit 220 of sensor 2 rewrites the packet number that is stored in packet number storage unit 213, as an initial value (for example, 0) that is determined in advance. Then, control unit 120 of base unit 1, like sensor 2, rewrites the packet number that is stored in packet number storage unit 106, as an initial value (for example, 0) that is determined in advance.

When the packet service activation is completed, sensor 2 transmits a call release request for releasing a call setup (Step: 305). When receiving the call release request, base unit 1 transmits a call release confirmation (Step: 408).

A wireless link disconnection completion message is transmitted from both sides, and transmission and reception operations for performing the communication of the call control message are interrupted (Step: 306) (Step: 409). Control unit 220 of sensor 2 starts processing that re-transmits a packet notifying that the window is opened (Step:307). Control unit 120 of base unit 1 proceeds to the waiting state (Step: 410). At this point, operation of base unit 1 in the waiting state is the same as the operation that is described referring to FIG. 4 (Step: 200), and a description thereof is omitted.

In the case where base unit 1 and sensor 2 perform the communication through the wireless communication in compliance with the DECT scheme, the wireless link establishment request is a message called access request that is the message for controlling the MAC layer, the wireless link establishment confirmation is a message called bearer_confirm that is the message for controlling the MAC layer, the call setup request is a message called CC-SETUP that is a message for controlling a NWK layer, the call setup notification is a message called NWKCC-CALL-PROC that is the message for controlling the NWK layer, the call release request is a message called NWKCC-RELEASE that is the message for controlling the NWK layer, the call release confirmation is a message called CC-RELEASE-COM that is the message for controlling the NWK layer, and the wireless link disconnection is a message called release. In a case where the communication is performed through the wireless communication in compliance with the DECT scheme, a procedure for activation of the DLC layer for transmission and reception of an NWK layer message is needed after establishment of the wireless link, but an example of this is omitted.

Figure 6:
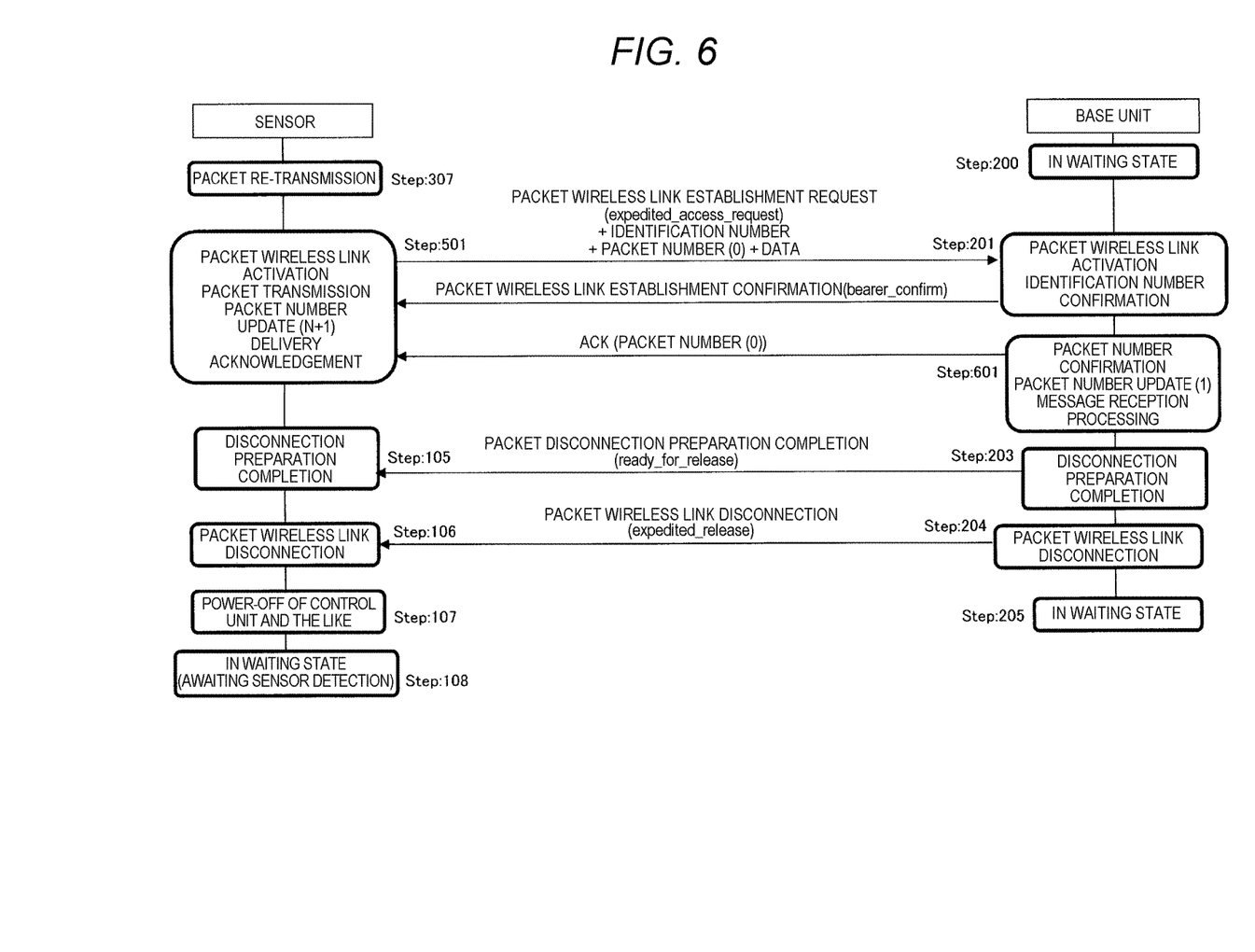
FIG. 6 is a diagram illustrating one example of a signal at the time of packet re-transmission which, after power is re-applied to the base unit, is transmitted and received through the wireless communication between the base unit and the sensor according to the first exemplary embodiment, and of operation of each of the base unit and the sensor.

Next, an operation example of a case where power is re-applied to base unit 1 that is in operation, the packet service activation is completed, and then the packet is re-transmitted, that is, an operation of re-transmitting a packet after the operation that is described referring to FIG. 5, in the home automation network system that uses the wireless communication device according to the present invention, which is described above, is described.

FIG. 6 is a diagram illustrating one example of a signal at the time of packet re-transmission that is transmitted and received through the wireless communication between the base unit and the sensor after power is re-applied to the base unit, and of operation of each of the base unit and the sensor. In FIG. 6, Step in which the same operation as the operation in FIG. 4 or 5 is performed is given the same number, and a description thereof is omitted here.

After the packet service activation is completed, as described referring to Step: 410 in FIG. 5, base unit 1 waits for a packet from sensor 2 in the waiting state in Step: 200 in FIG. 4. At this time, while transmitting a control signal, control unit 120 of base unit 1 operates in such a manner that wireless communication unit 101 is controlled to receive a signal from sensor 2.

On the other hand, after the packet service activation is completed, sensor 2 transmits to base unit 1 the packet that results from packetizing the data of the message notifying base unit 1 the packet wireless link establishment request and that the window is opened and performs control in such a manner that the delivery confirmation is performed (Step: 501). At this time, control unit 220 reads a packet number for the delivery acknowledgement that is attached to a packet, from packet number storage unit 213 and performs control in such a manner that the packet number which is stored in packet number storage unit 213 in preparation for the next-time packet transmission is updated. Control unit 220 reads the identification number which is stored in EEPROM 204 and performs control in such a manner that the identification number which is read as one portion of the wireless establishment request message is transmitted. An operation in Step: 501 and the operation in Step: 104 that is described referring to FIG. 4 are different from each other in the packet number that is stored in packet number storage unit 213. In Step: 501, because the first packet transmission after the packet service activation takes place, the packet number that is stored in packet number storage unit 213 is an initial value (for example, 0) that is determined in advance. For example, a value that, after updating, is stored in packet number storage unit 213 is 0 in a case of an initial value, and is 1 in a case where an operation is performed in such a manner that one packet number is updated for every packet.

On the other hand, control unit 120 of base unit 1, as described referring to FIG. 4, checks an identification number that is sent, by comparing the identification that is sent against the identification number for every sensor, which is stored in EEPROM 107, transmits the packet wireless establishment confirmation to sensor 2, and establishes the wireless link for the packet communication (Step: 201).

Control unit 120 reads a corresponding packet number of the sensor, among the packet numbers that are stored in packet number storage unit 106, compares the packet number that is sent, against the packet number that is read, and determines whether or not the two packet numbers are the same. In the case where the packet number that is sent and the packet number of the sensor, which is stored in packet number storage unit 106 are the same, control is performed in such a manner that the processing that receives the message that is sent in the packet format, that is, the message notifying that the window is opened, for example, the processing that activates the alarm in informing unit 103 or notifies handset 3 and smartphone 5 that the window is opened, is performed, that the packet number corresponding to sensor 2, which is stored in packet number storage unit 106 in preparation for the next-time packet reception, is updated, and that the delivery acknowledgement (ACK) notifying sensor 2 that the packet is received is sent (Step: 601). An operation in Step: 601 and the operation in Step: 202 that is described referring to FIG. 4 are different from each other in the packet number that is stored in packet number storage unit 106. In Step: 501, because the first packet reception after the packet service activation takes place, the packet number that is stored in packet number storage unit 106 is an initial value (for example, 0) that is determined in advance. For example, the value that, after update, is stored in packet number storage unit 106 is 0 in a case of an initial value, and is 1 in the case where an operation is performed in such a manner that one packet number is updated for every packet.

When the transmission and reception of the delivery acknowledgement (ACK) are completed and the packet communication interruption preparation is completed, as described above referring to FIG. 4, both sensor 2 and base unit 1 send the packet disconnection preparation completion message notifying that the packet communication interruption preparation is completed (Step: 105) (Step: 203), transmit the packet wireless link disconnection message notifying that the packet wireless link is disconnected, and interrupt the transmission and receptions operations for the packet communication (Step: 106) (Step: 204).

As described above referring to FIG. 4, sensor 2 powers off wireless communication unit 201, RAM 202, EEPROM 204, ROM 206, and control unit 220 (Step: 107), and proceeds to the waiting state in which it is detected that the window is opened (Step: 108).

In the same manner, when the transmission and reception operations for the packet communication are interrupted, as described above referring to FIG. 4, base unit 1 also proceeds to the waiting state in which base unit 1 waits for communication with the sensor (Step: 205).

The embodiment of the present invention is described above. As described above, because the wireless communication device according to the present invention activates the transmission and reception and transmits a packet only when data transmission is necessary, this is effective in low power consumption by the wireless communication device.

Because the wireless communication device according to the present invention supplies power to a control unit and a wireless communication unit only when the data transmission is necessary, and enables the control unit and the wireless communication unit to operate, this is effective in low power consumption by the wireless communication device.

Because, the number of times that a necessary control message is exchanged for activating the packet communication to transmit the packet is decreased. Thus, the control time can be shortened and this is effective in low power consumption at the time of communication and is successful in shortening a response time.

Because there is no need to use a nonvolatile memory as a means of storing the packet number, such as an EEPROM, a capacity of the nonvolatile memory that is used in the wireless communication device can be decreased. This leads to an effect of cost reduction. Furthermore, because control in which it is considered that there is a limitation to writing to the nonvolatile memory does not need to be performed, this leads to an effect of making it easy to build a system.

Even in a case where power is re-applied to only one wireless communication device and a parameter necessary for the packet communication, such as the packet number, is lost, an effect is achieved in which the packet communication can be resumed with a simple procedure and it is easy to build a system that can overcome a failure such as a power failure.

The wireless communication device according to the present invention is useful as a wireless communication device for building a home network.

What is claimed is:

1. A wireless communication device that receives a data packet including a packet number from the other communication party, the wireless communication device comprising:
    a memory in which the packet number is stored;
    a processor; and
    a wireless transmitter/receiver that transmits and receives the data packet based on control of the processor,
    wherein, after power is applied, the processor rewrites a packet number that is stored in the memory, to be an initial value that is determined in advance, and checks whether or not a packet number that is included in the data packet from the other communication party is consistent with the packet number that is stored in the memory,
    wherein in a case where the two packet numbers are consistent with each other, the processor generates a delivery acknowledgement including the packet number that is stored in the memory, transmits the generated delivery acknowledgement from the wireless transmitter/receiver to the other communication party, and updates the packet number that is stored in the memory, and
    wherein in a case where the two packet numbers are not consistent with each other, the processor generates a disconnection instruction to which a message urging activation of a packet service is added, and transmits the generated disconnection instruction from the wireless transmitter/receiver to the other communication party,
    wherein the message urging activation of the packet service causes the other communication party to rewrite the packet number stored in a memory of the other communication party to be the initial value.

2. A wireless communication system, comprising:
    a first wireless communication device; and
    a second wireless communication device that establishes a wireless link between the first wireless communication device and the second wireless communication device and transmits a data packet that includes a packet number,
    wherein, when the data packet is received from the second wireless communication device, the first wireless communication device checks whether or not the packet number that is included in the data packet is consistent with a packet number that is stored in a first memory,
    wherein, in a case where the two packet numbers are consistent with each other, the first wireless communication device transmits, to the second wireless communication device, a delivery acknowledgement that includes the packet number which is stored in the first memory, and updates the packet number that is stored in the first memory,
    wherein the second wireless communication device, when the delivery acknowledgement is received from the first wireless communication device, updates a packet number that is stored in a second memory,
    wherein, after power is applied, the first wireless communication device, rewrites the packet number that is stored in the first memory, as an initial value that is determined in advance,
    wherein, in a case where the two packet numbers are not consistent with each other, the first wireless communication device transmits to the second wireless communication device a disconnection instruction to which a message urging activation of a packet service is added, and
    wherein the second wireless communication device, when the disconnection instruction to which the message urging the activation of the packet service is added is received, from the first wireless communication device, activates the packet service between the second wireless communication device and the first wireless communication device and rewrites the packet number that is stored in the second memory, to be the initial value.

3. The wireless communication system of claim 2,
    wherein the second wireless communication device has a sensor, and
    wherein, when a wireless link between the second wireless communication device and the first wireless communication device is disconnected, in a case where the sensor detects that a window is opened, the second wireless communication device transmits a data packet including a request for the establishment of the wireless link, a message notifying that the window is opened, and a packet number that is stored in the second memory.

* * * * *